United States Patent
Lee et al.

(10) Patent No.: US 11,317,278 B2
(45) Date of Patent: Apr. 26, 2022

(54) DEVICE AND METHOD FOR DETECTING MISMATCH OF ENCRYPTION PARAMETER IN WIRELESS COMMUNICATION SYSTEM

(71) Applicant: Samsung Electronics Co., Ltd., Suwon-si (KR)

(72) Inventors: Janghee Lee, Anyang-si (KR); Sejin Park, Suwon-si (KR); Wonil Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 16/624,064

(22) PCT Filed: Jun. 5, 2018

(86) PCT No.: PCT/KR2018/006375
§ 371 (c)(1),
(2) Date: Dec. 18, 2019

(87) PCT Pub. No.: WO2019/004623
PCT Pub. Date: Jan. 3, 2019

(65) Prior Publication Data
US 2021/0168597 A1     Jun. 3, 2021

(30) Foreign Application Priority Data
Jun. 26, 2017 (KR) .................. 10-2017-0080325

(51) Int. Cl.
*H04W 12/037*     (2021.01)
*H04W 76/19*     (2018.01)
(Continued)

(52) U.S. Cl.
CPC ....... *H04W 12/037* (2021.01); *H04W 12/106* (2021.01); *H04W 36/08* (2013.01); *H04W 76/19* (2018.02); *H04W 80/02* (2013.01)

(58) Field of Classification Search
CPC . H04W 12/037; H04W 76/19; H04W 12/106; H04W 36/08; H04W 80/02;
(Continued)

(56) References Cited

U.S. PATENT DOCUMENTS

2004/0193891 A1\*    9/2004   Ollila .................... H04L 9/3242
                                                                                             713/182
2006/0050679 A1    3/2006   Jiang
(Continued)

OTHER PUBLICATIONS

Extended European Search Report dated May 18, 2020, issued in a counterpart European Application No. 18824815.7-1218 / 3637660.
(Continued)

*Primary Examiner* — Mewale A Ambaye
(74) *Attorney, Agent, or Firm* — Jefferson IP Law, LLP

(57) ABSTRACT

Disclosed is a fifth generation (5G) or pre-5G communication system for supporting data transmission rate higher than that of a fourth generation (4G) communication system such as long term evolution (LTE). The objective of the present disclosure is to detect a mismatch of an encryption parameter in a wireless communication system, and an operating method of a reception end includes the steps of: receiving, from a transmission end, a packet including information related to a serial number of the packet and an encryption parameter determined on the basis of the serial number; determining whether the encryption parameter determined by the reception end is mismatched, on the basis of the information related to the serial number and the encryption parameter.

12 Claims, 9 Drawing Sheets

(51) Int. Cl.
*H04W 12/106* (2021.01)
*H04W 36/08* (2009.01)
*H04W 80/02* (2009.01)

(58) Field of Classification Search
CPC . H04W 12/00; H04W 76/00; H04W 36/0033; H04W 12/10; H04W 12/104; H04W 36/10; H04W 36/12; H04W 80/00
See application file for complete search history.

(56) References Cited

U.S. PATENT DOCUMENTS

| | | | | |
|---|---|---|---|---|
| 2008/0096530 | A1* | 4/2008 | Kuo | H04W 12/037 455/411 |
| 2009/0003283 | A1 | 1/2009 | Meylan | |
| 2011/0263221 | A1 | 10/2011 | Yi et al. | |
| 2012/0207302 | A1 | 8/2012 | Alexander et al. | |
| 2013/0301611 | A1* | 11/2013 | Baghel | H04W 74/0833 370/331 |
| 2015/0280905 | A1* | 10/2015 | Shah | H04W 28/0273 370/504 |
| 2015/0382395 | A1 | 12/2015 | Yang et al. | |
| 2016/0249232 | A1* | 8/2016 | Uchino | H04L 1/1832 |
| 2019/0021069 | A1* | 1/2019 | Chun | H04W 76/10 |

OTHER PUBLICATIONS

Ericsson: Network detection of HFN de-sync problem; 3GPP TSG RAN WG3 Meeting #77bis, R3-122295 Sep. 29, 2012, Sophia-Antipolis, France.
Huawei et al., PDCP Sync Protection in NR, 3GPP TSG-RAN WG2 Meeting #98, R2-1705123, May 14, 2017, section 2.2, Hangzhou, China.
European Search Report dated Mar. 9, 2020, issued in the European Application No. 18824815.7.
3rd Generation Partnership Project; Technical Specification Group Radio Access Network; Evolved Universal Terrestrial Radio Access (E-UTRA); Packet Data Convergence Protocol (PDCP) specification (Release 15), 3GPP TS 36.323 V15.4.0 Jun. 2019, Valbonne, France.
Nokia et al., Considerations on suspend resume, 3GPP TSG-RAN WG2 Meeting #97, R2-1700737, Feb. 3, 2017, Athens, Greece.
European Office Action dated Feb. 10, 2021, issued in a counterpart European Application No. 18 824 815.7-1218.

* cited by examiner

: SERIAL NUMBER

: CIPHERING PARAMETER INFORMATION

DEVICE AND METHOD FOR DETECTING MISMATCH OF ENCRYPTION PARAMETER IN WIRELESS COMMUNICATION SYSTEM

TECHNICAL FIELD

The present disclosure generally relates to a wireless communication system, and more particularly, relates to an apparatus and a method for detecting mismatch of a ciphering parameter in the wireless communication system in.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Similarly to a conventional system (e.g., LTE), the 5G system may adopt a ciphering scheme for security of data transmitted and received over a radio channel. The ciphering indicates a procedure for ciphering/de-ciphering a packet using the same key or a ciphering parameter between a transmitting device and a receiving device. In so doing, a value of the key or the ciphering parameter may be fixed, or may change according to a situation.

DISCLOSURE OF INVENTION

Technical Problem

Based on the discussions described above, the present disclosure provides an apparatus and a method for effectively detecting mismatch of a ciphering parameter in a wireless communication system.

In addition, the present disclosure provides an apparatus and a method for including information related to a ciphering parameter not explicitly signaled in a packet header in a wireless communication system.

In addition, the present disclosure provides an apparatus and a method for synchronizing a ciphering parameter in a wireless communication system.

Solution to Problem

According to various embodiments of the present disclosure, a method for operating a receiving device in a wireless communication system includes receiving a packet including a serial number of the packet and information related to a ciphering parameter determined based on the serial number, from a transmitting device, and determining whether the ciphering parameter determined by the receiving device mismatches based on the serial number and the information related to the ciphering parameter.

According to various embodiments of the present disclosure, a method for operating a transmitting device in a wireless communication system includes generating a packet that includes a serial number of the packet and information related to a ciphering parameter determined based on the serial number, and transmitting the packet to a receiving device.

According to various embodiments of the present disclosure, an apparatus for a receiving device in a wireless communication system includes a transceiver configured to receive a packet including a serial number of the packet and information related to a ciphering parameter determined based on the serial number, from a transmitting device, and at least one processor configured to determine whether the ciphering parameter determined by the receiving device mismatches based on the serial number and the information related to the ciphering parameter.

According to various embodiments of the present disclosure, an apparatus for a transmitting device in a wireless communication system includes at least one processor configured to generate a packet that includes a serial number of the packet and information related to a ciphering parameter determined based on the serial number, and a transceiver configured to transmit the packet to a receiving device.

According to various embodiments of the present disclosure, A method for operating a receiving device in a wireless communication system includes receiving a packet including a serial number of the packet, from a transmitting device, identifying other serial number used at a second layer that is different from a first layer that processes the packet, and determining whether a ciphering parameter determined based on the serial number mismatches, based on the serial number and changes of the other serial number.

Advantageous Effects of Invention

An apparatus and a method according to various embodiments of the present disclosure may, by including information relating to a ciphering parameter in a header, detect mismatch of the ciphering parameter and further synchronize the ciphering parameter.

Effects obtainable from the present disclosure are not limited to the above mentioned effects, and other effects which are not mentioned may be clearly understood by those skilled in the technical field of the present disclosure through the following descriptions.

BEST MODE FOR CARRYING OUT THE INVENTION

The terms used in the present disclosure are only used to describe specific embodiments, and are not intended to limit other embodiments. Singular expressions may include plural expressions as well unless the context clearly indicates otherwise. All terms used herein, including technical and scientific terms, may have the same meaning as those commonly understood by a person skilled in the art to which the present disclosure pertains. Terms such as those defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for detecting mismatch of a ciphering parameter used for ciphering and de-ciphering a packet in a wireless communication system. More specifically, the present disclosure describes a technique for detecting the mismatch of the ciphering parameter and resolving the mismatch, that is, synchronizing the ciphering parameter in the wireless communication system.

Terms indicating communication layers, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., $3^{rd}$ generation partnership (3GPP)), which is merely an example for explanations. Various embodiments of the present disclosure may be easily modified and applied in other communication systems.

Figure 1:
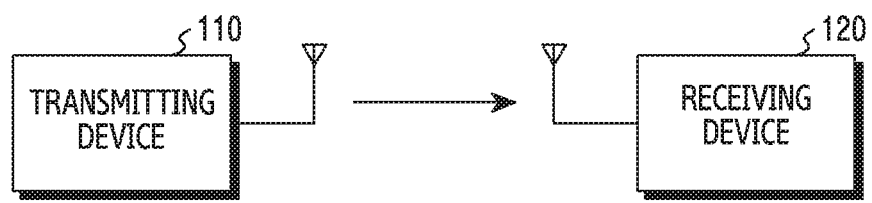
FIG. 1 illustrates a wireless communication system according to various embodiments of the present disclosure.

FIG. 1 illustrates a wireless communication system according to various embodiments of the present disclosure. FIG. 1 illustrates a transmitting device 110 and a receiving device 120, as nodes which use a radio channel in the wireless communication system.

The transmitting device 110 generates a packet including data, and transmits the packet to the receiving device 120 over a radio channel. In so doing, the transmitting device 110 ciphers the packet or the data in the packet, that is, a payload. Hence, the receiving device 120 de-ciphers the received packet or payload. Thus, data security in the radio channel may be maintained.

For the ciphering and the de-ciphering, the transmitting device 110 and the receiving device 120 may use at least one ciphering parameter. The ciphering parameter may be defined variously. For example, the ciphering parameter may be defined to be derived from control information included in the packet. Specifically, as a concrete example, at least one ciphering parameter may be determined based on a serial number (SN) of the packet. In a long term evolution (LTE) system, the ciphering performed at a packet data convergence protocol (PDCP) layer uses a 'COUNT' value for the ciphering and the de-ciphering, and COUNT is defined as a combination of a hyper frame number (HFN) of a PDCP packet (hereafter, 'PDCP HFN') and the SN of the PDCP packet (hereafter, 'PDCP SN'). Hence, the transmitting device 110 and the receiving device 120 which ciphers and de-ciphers one packet need to use the same COUNT value (=PDCP HFN+PDCP SN). This means that the transmit HFN of the transmitting device 110 and the receive HFN of the receiving device 120 need to be maintained as the same value.

The PDCP SN is explicitly indicated in the packet header, and increments by one for every packet. The PDCP HFN is not explicitly signaled, and increments by one each time the PDCP SN exceeds and circulates over a maximum value, that is, the PDCP SN wraps around. Specifically, the receiving device 120 may increase the PDCP HFN by one if the PDCP packet is received and the PDCP SN is the maximum value, or may increase the PDCP HFN by one if the PDCP packet is received and the PDCP SN is smaller than a previously received value. That is, unlike the PDCP SN, the PDCH HFN is managed as an internal state variable by the transmitting device 110 and the receiving device 120 respectively.

According to an embodiment, the transmitting device 110 and the receiving device 120 may transmit and receive radio signals in a millimeter wave (mmWave) band (e.g., 28 GHz, 30 GHz, 38 GHz, 60 GHz). In so doing, to improve a channel gain, the transmitting device 110 and the receiving device 120 may perform beamforming Herein, the beamforming includes transmit beamforming and receive beamforming. That is, the transmitting device 110 and the receiving device 120 may give directivity to a transmit signal and a received signal. For doing so, the transmitting device 110 and the receiving device 120 may select serving beams 112, 113, 121, and 131 through a beam search procedure.

The transmitting device 110 and the receiving device 120 described in FIG. 1 are relative concepts, and a particular device may serve as both of the transmitting device 110 and the receiving device 120. For example, in an uplink of a cellular communication system, the transmitting device 110 may be a terminal and the receiving device 120 may be a base station. As another example, in a downlink, the transmitting device 110 may be a base station and the receiving device 120 may be a terminal.

The base station is a network infrastructure for providing radio access to at least one terminal. The base station has coverage defined as a particular geographical area based on a signal transmission distance. The base station may be referred to as, besides the base station, an access point (AP), an eNodeB (eNB), a 5th generation node (5G node), a wireless point, a transmission/reception point (TRP), or other term having a technically equivalent meaning.

The terminal is a device used by a user, and performs communication with the base station over the radio channel. In some cases, the terminal may be operated without user's involvement. For example, the terminal is a device for performing machine type communication (MTC), and may not be carried by the user. The terminal may be referred to as, besides the terminal, a user equipment (UE), a mobile station, a subscriber station, a remote terminal, a wireless terminal, or a user device, or other term having a technically equivalent meaning.

As mentioned in FIG. 1, the transmitting device 110 transmits the ciphered packet, and the receiving device 120 receives and de-ciphers the packet. In so doing, for successful de-ciphering and data reception, it is required to synchronize the ciphering parameter, such as the PDCP HFN suggested as an example, used for the ciphering/de-ciphering. However, mismatch of the ciphering parameter may occur in the following situation.

The receiving device 120 receives a PDCP protocol data unit (PDU) #1 from the transmitting device 110. If a PDCP PDU #2 is received, an error occurs in the PDCP header, and accordingly the SN value of the PDCP PDU #2 is identified as a value smaller than the SN value of the PDCP PDU #1. As a result, the receiving device 120 increases the PDCP HFN by one. However, since the transmitting device 110 maintains the existing PDCP HFN, the PDCP HFN mismatch occurs between the transmitting device 110 and the receiving device 120.

As above, since the ciphering parameter such as PDCP HFN is not explicitly exchanged, even if the mismatch occurs, it is not easy to identify the mismatch. Once the ciphering parameter mismatches, it is not recovered and thus de-ciphering failure of the ciphered packet may continue. The continuous de-ciphering failure may be recognized as, in view of the user, data communication failure. However, the transmitting device 110 and the receiving device 120, which may not recognize any problem, may have great difficulty in discovering and debugging the problem.

In the example of the mismatch of the ciphering parameter as described above, the PDCP HFN is suggested as the example of the ciphering parameter to ease the explanations. However, the following various embodiments may be applied to the mismatch of other ciphering parameter than the PDCP HFN.

Figure 2:
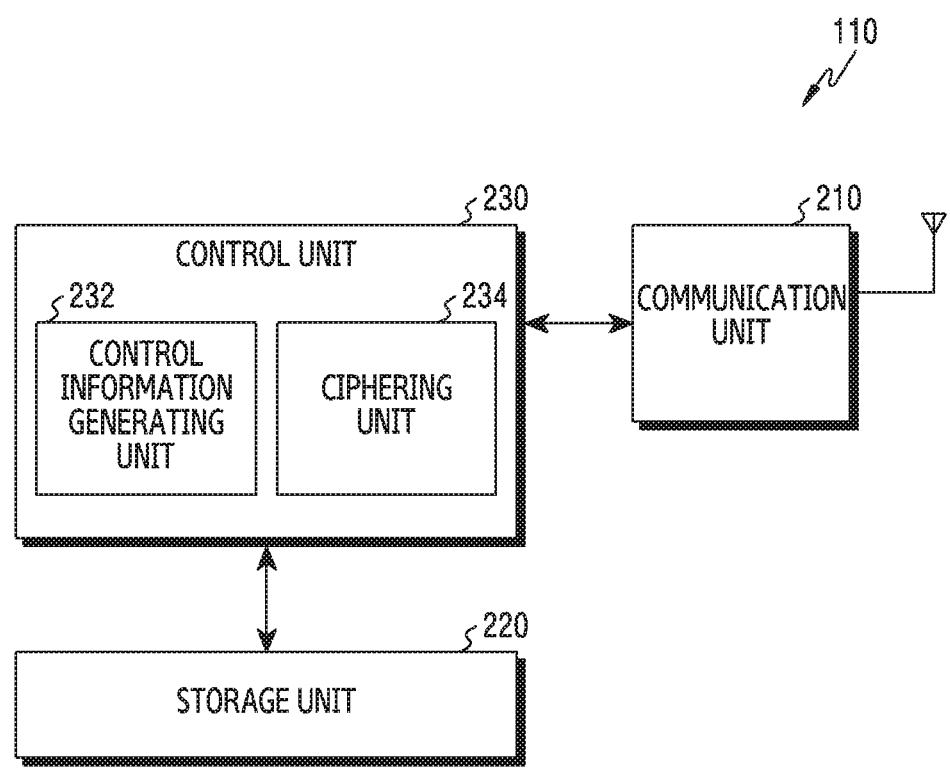
FIG. 2 illustrates a configuration of a transmitting device in a wireless communication system according to various embodiments of the present disclosure.

FIG. 2 illustrates a configuration of a transmitting device in a wireless communication system according to various embodiments of the present disclosure. The configuration of FIG. 2 may be understood as the configuration of the transmitting device 110. A term such as 'portion' or '~er' indicates a unit for processing at least one function or operation, and may be implemented using hardware, software, or a combination of hardware and software.

Referring to FIG. 2, the transmitting device 110 includes a communication unit 210, a storage unit 220, and a control unit 230.

The communication unit 210 may perform functions for transmitting and receiving signals over a radio channel. For example, the communication unit 210 performs a conversion function between a baseband signal and a bit string according to a physical layer standard of a system. For example, in data transmission, the communication unit 210 generates complex symbols by encoding and modulating a transmit bit string. Also, in data reception, the communication unit 210 restores a receive bit string by demodulating and decoding a baseband signal. Also, the communication unit 210 up-converts the baseband signal to a radio frequency (RF) band signal, transmits it via an antenna, and down-converts an RF band signal received via an antenna to a baseband signal.

For doing so, the communication unit 210 may include a transmit filter, a receive filter, an amplifier, a mixer, an oscillator, a digital to analog convertor (DAC), an analog to digital convertor (ADC), and so on. In addition, the communication unit 210 may include a plurality of transmit and receive paths. Further, the communication unit 210 may include at least one antenna array including a plurality of antenna elements. In terms of the hardware, the communication unit 210 may include a digital circuit and an analog circuit (e.g., an RF integrated circuit).

The communication unit 210 transmits and receives the signals as stated above. Hence, all or part of the communication unit 210 may be referred to as a transmitter, a receiver, or a transceiver. Also, in the following, the transmission and the reception over the radio channel is used as the meaning which embraces the above-stated processing of the communication unit 210.

The storage unit 220 stores a basic program for operating the transmitting device, an application program, and data such as setting information. The storage unit 220 may include a volatile memory, a non-volatile memory, or a combination of a volatile memory and a non-volatile memory. The storage unit 220 provides the stored data in response to a request of the control unit 230.

The control unit 230 controls general operations of the transmitting device. For example, the control unit 230 transmits and receives signals through the communication unit 210. Also, the control unit 230 records and reads data in and from the storage unit 220. The control unit 230 may perform functions of a protocol stack required by a communication standard. For doing so, the control unit 230 may include at least one processor. According to various embodiments, the control unit 2030 may include a control information generating unit 232 for generating control information included in the packet header and a ciphering unit 234 for ciphering the packet. Herein, the control information generating unit 232 and the ciphering unit 234 may be, as an instruction set or code stored in the storage unit 220, the instructions/code resided in the control unit 230 at least temporarily or a storage space storing the instructions/code, or part of circuitry of the control unit 230.

According to various embodiments, the control unit 230 generates the packet including the ciphered payload. In so doing, the control unit 230 may include necessary information for detecting mismatch of a ciphering parameter in the packet header. For example, the control unit 230 may control the transmitting device to carry out operations to be explained according to various embodiments.

Figure 3:
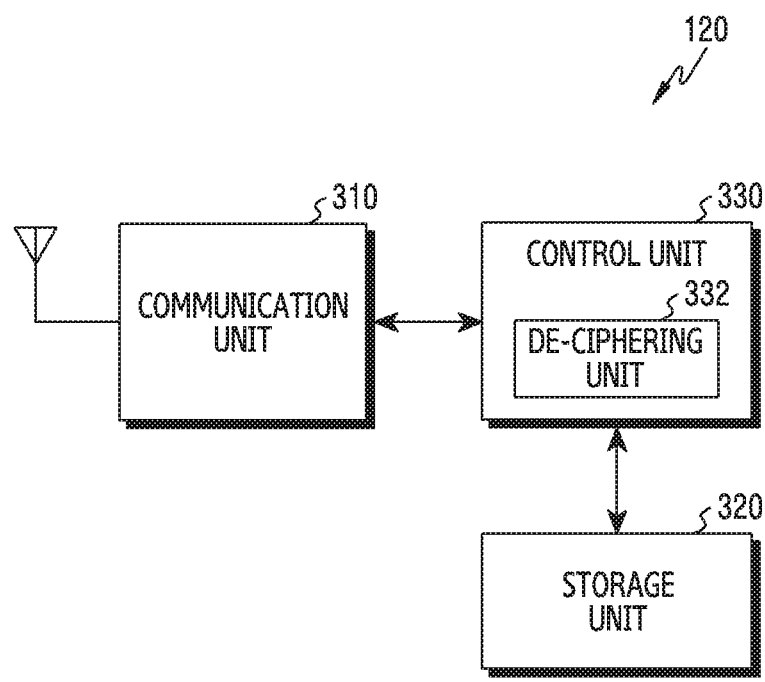
FIG. 3 illustrates a configuration of a receiving device in a wireless communication system according to various embodiments of the present disclosure.

FIG. 3 illustrates a configuration of a terminal in a wireless communication system according to various embodiments of the present disclosure. The configuration of FIG. 3 may be understood as the configuration of the receiving device 120. A term such as 'portion' or '~er' indicates a unit for processing at least one function or operation, and may be implemented using hardware, software, or a combination of hardware and software.

Referring to FIG. 3, the receiving device 120 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of a system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via an antenna to a baseband signal. For example, the communication unit 310 may include a transmit filter, a receive filter, an amplifier, a mixer, an oscillator, a DAC, an ADC, and so on. In terms of the hardware, the communication unit 310 may include a digital circuit and an analog circuit (e.g., an RFIC).

The communication unit 310 transmits and receives the signals as stated above. Hence, all or part of the communication unit 310 may be referred to as a transmitter, a receiver, or a transceiver. Also, in the following, the transmission and the reception over the radio channel is used as the meaning which embraces the above-stated processing of the communication unit 310.

The storage unit 320 stores a basic program for operating the receiving device 120, an application program, and data such as setting information. The storage unit 320 may include a volatile memory, a non-volatile memory, or a combination of a volatile memory and a non-volatile memory. The storage unit 320 provides the stored data in response to a request of the control unit 330.

The control unit 330 controls general operations of the receiving device 120. For example, the control unit 330 transmits and receives signals through the communication unit 310. Also, the control unit 330 records and reads data in and from the storage unit 320. The control unit 330 may perform functions of a protocol stack required by a communication standard. For doing so, the control unit 330 may include at least one processor or microprocessor, or may be part of a processor. According to various embodiments, the control unit 330 may include a de-ciphering unit 332 which determines and manages a ciphering parameter, and de-ciphers ciphered data. Herein, the de-ciphering unit 332 may be, as an instruction set or code stored in the storage unit 320, the instructions/code resided in the control unit 330 at least temporarily or a storage space storing the instructions/code, or part of circuitry of the control unit 330.

According to an embodiment, the control unit 330 may determine whether the ciphering parameter mismatches using information contained in a header of a packet received from a transmitting device (e.g., the transmitting device 110). If detecting the mismatch of the ciphering parameter, the control unit 330 may try to recover the ciphering parameter, or initialize the ciphering parameter to solve the mismatch of the ciphering parameter. For example, the control unit 330 may control the receiving device to carry out operations to be explained according to various embodiments.

Figure 4:
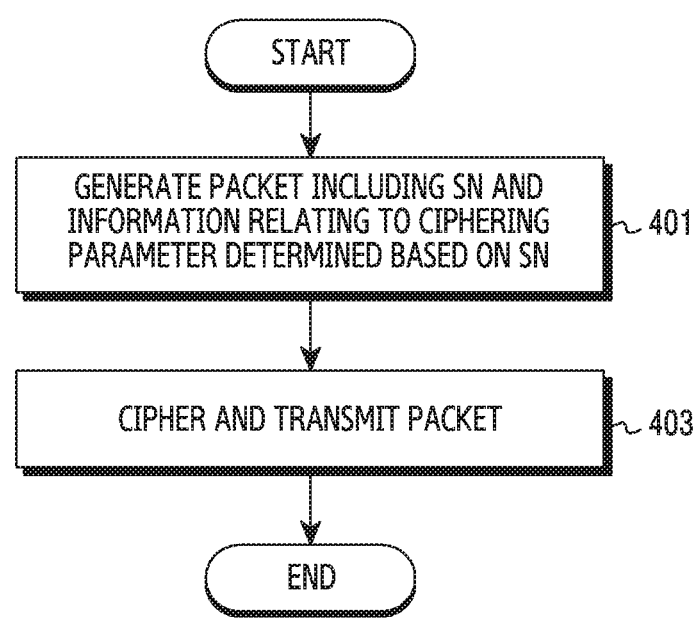
FIG. 4 illustrates a flowchart of a transmitting device in a wireless communication system according to various embodiments of the present disclosure.

FIG. 4 illustrates a flowchart of a transmitting device in a wireless communication system according to various embodiments of the present disclosure. FIG. 4 illustrates an operating method of the transmitting device 110.

Referring to FIG. 4, in step 401, the transmitting device generates a packet including an SN and information relating to a ciphering parameter which is determined based on the SN. That is, the packet includes a header, and the header includes the SN of the corresponding packet and further includes the ciphering parameter information derived from the SN. The ciphering parameter information may be at least part of the ciphering parameter, or include a resulting value of a predefined function which uses the ciphering parameter as an input variable.

In step 403, the transmitting device ciphers and transmits the ciphered packet. For example, the ciphering may be performed on a payload in the packet, that is, other portion than the header. In so doing, the transmitting device performs the ciphering using the ciphering parameter determined based on the SN.

Figure 5:
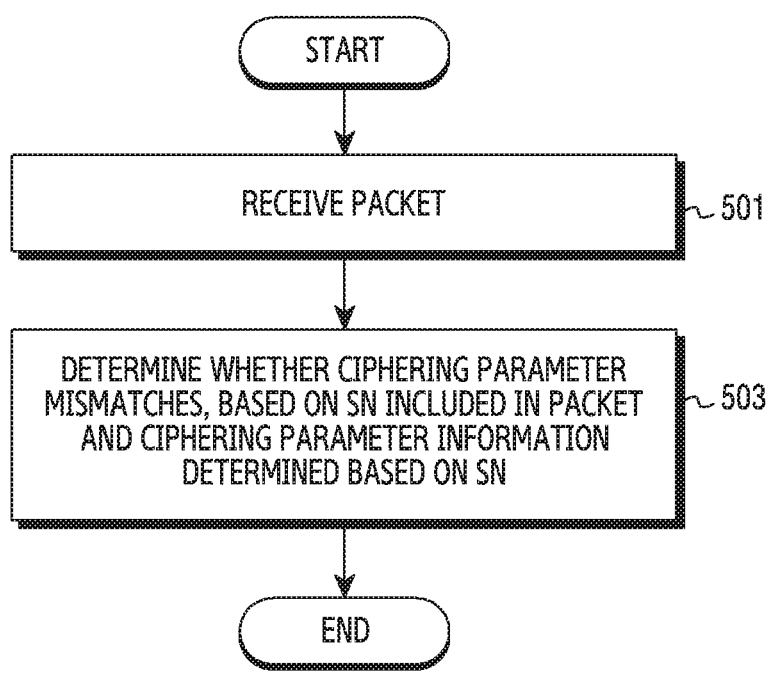
FIG. 5 illustrates a flowchart of a receiving device in a wireless communication system according to various embodiments of the present disclosure.

FIG. 5 illustrates a flowchart of a receiving device in a wireless communication system according to various embodiments of the present disclosure. FIG. 5 illustrates an operating method of the receiving device 120.

Referring to FIG. 5, in step 501, the receiving device receives a packet from a transmitting device. The packet includes a header and a payload, and the header includes control information relating to the packet. The header includes an SN and information relating to a ciphering parameter which is determined based on the SN.

In step 503, the receiving device determines whether the ciphering parameter mismatches based on the SN included in the packet and the ciphering parameter information determined based on the SN. The ciphering parameter information may be at least part of the ciphering parameter, or include a resulting value of a predefined function which uses the ciphering parameter as an input variable. Hence, the receiving device may derive the ciphering parameter based on the SN, check validity of the derived ciphering parameter using the ciphering parameter information, and thus determine whether the ciphering parameter mismatches.

As shown in the embodiment described with FIG. 4 and FIG. 5, since the ciphering parameter information is included in the packet header, the receiving device may detect whether the ciphering parameter mismatches. For example, the ciphering parameter information may be at least part of the ciphering parameter, or include a resulting value of a predefined function which uses the ciphering parameter as an input variable.

Figure 6:
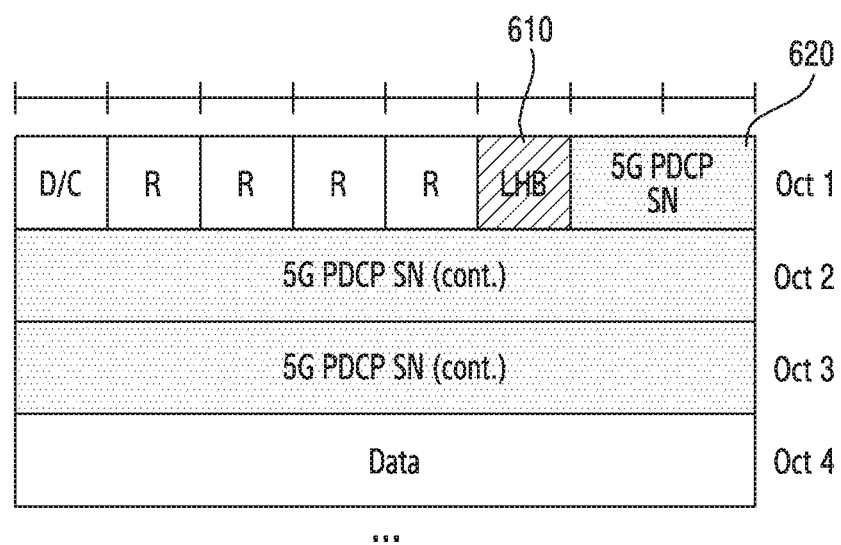
FIG. 6 illustrates an example of a packet structure including ciphered data in a wireless communication system according to various embodiments of the present disclosure.
Figure 6:
Figure 6:

According to an embodiment, the ciphering parameter information may indicate the last bit of the ciphering parameter calculated at the transmitting device. For example, if the ciphering parameter is a PDCP HFN, the ciphering parameter information may be constructed as shown in FIG. 6. FIG. 6 illustrates an example of a packet structure including ciphered data in a wireless communication system according to various embodiments of the present disclosure. Referring to FIG. 6, a 5G PDCP SN 620 which is the SN in 18-bit size occupies from last two bits of a first octet of the packet to a third octet, and a last HFN bit (LHB) 610 which is the ciphering parameter information occupies a sixth bit of the first octet. For example, if the PDCP HFN is 10 (=0b1010), the value of the LHB 610 is set to '0'. According to another embodiment, the position of the LHB 610 may vary. According to another embodiment, the LHB 610 may be defined in size over two bits.

If the header is constructed as shown in FIG. 6, the transmitting device includes the 18-bit PDCP SN in a 3-byte header. In so doing, the last bit of the HFN value used to calculate COUNT for the ciphering of the PDCP PDU is copied into the LHB 610 field of the PDCP header. Since the increment of the PDCP HFN is 1, whether the HFN is changed or not may be identified merely with the last bit of the HFN. That is, without carrying all the HFN value to the receiving device, whether the HFN value used currently at the transmitting device for the ciphering is appropriate may be determined, using only one bit of a reserved field constructing the current PDCP header. The receiving device compares the last bit of the HFN value internally managed and the LHB field value of the PDU header to determine the COUNT value of the received PDCP PDU. If the two values are different from each other, the receiving device may determine mismatch of the HFN. A specific example of a situation in which the mismatch of the HFN is determined is now explained by referring to FIG. 7.

Figure 7:
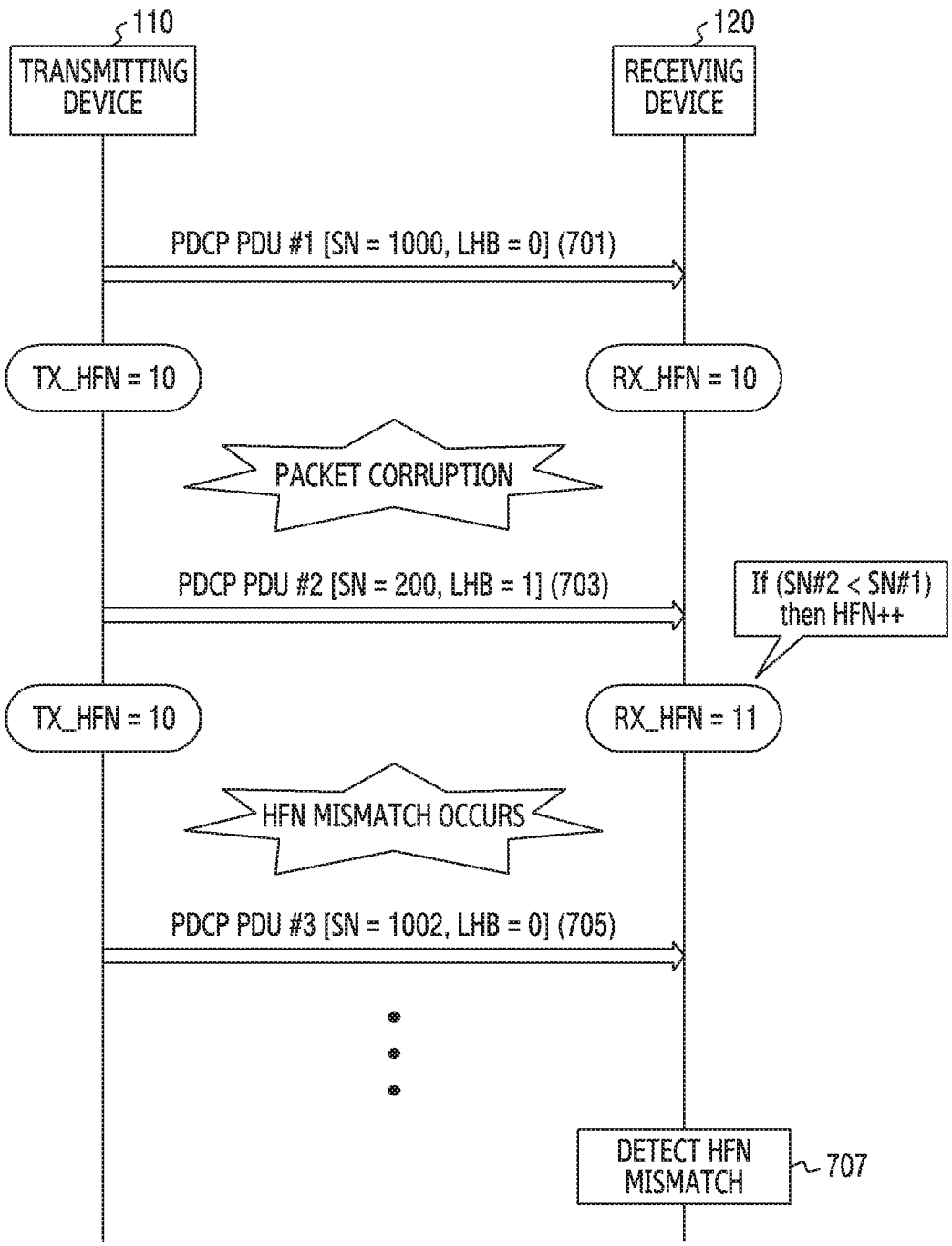
FIG. 7 illustrates an example of a situation for detecting mismatch of a ciphering parameter in a wireless communication system according to various embodiments of the present disclosure.

FIG. 7 illustrates an example of a situation of detecting mismatch of a ciphering parameter in a wireless communication system according to various embodiments of the present disclosure. FIG. 7 illustrates signal exchanges between the transmitting device 110 and the receiving device 120.

Referring to FIG. 7, in step 701, the transmitting device 110 transmits a PDCP PDU #1. Herein, a header of the PDCP PDU #1 includes an SN which is set to 1000 and an LHB which is set to 0. In so doing, the transmitting device 110 manages a transmit HFN as 10, and the receiving device 120 manages a receive HFN as 10. That is, the ciphering parameter is synchronized.

In step 703, the transmitting device 110 transmits a PDCP PDU #2. Herein, in the transmission, a header of the PDCP PDU #2 includes the SN which is set to 1001 and the LHB which is set to 0. However, the packet is corrupted by interference or fading of a radio channel. As a result, the header of the PDCP PDU #2 received at the receiving device 120 is decoded to include the SN which is set to 200 and the LHB which is set to 1. Thus, the transmit HFN calculated at the transmitting device 110 is still 10. However, since the SN in the previously received PDCP PDU #1 is greater than the SN in the PDCP PDU #2, the receive HFN calculated at the receiving device 120 is updated to 11. That is, mismatch of the ciphering parameter occurs.

In step 705, the transmitting device 110 transmits a PDCP PDU #3. Herein, a header of the PDCP PDU #3 includes the SN which is set to 1002 and the LHB which is set to 0. At this time, the receiving device 120 recognizes the receive HFN as 11, but the last bit of 11 is different from the LHB of the PDCP PDU #3.

In step 707, the receiving device 120 detects mismatch of the HFN. That is, the receiving device 120 may recognize the mismatch of the HFN, by comparing the LHB value of the PDCP PDU #3 and the last bit of the receive HFN value managed at the receiving device 120. In other words, after the HFN mismatch occurs, the receiving device 120 may know that the LHB value and the last bit of the HFN currently managed are different if receiving the PDCP PDU #3 which is a normal packet.

In the embodiment of FIG. 7, the receiving device 120 receives the PDCP PDU #3 and then determines the HFN mismatch. However, according to another embodiment, the receiving device 120 may further receive at least one PDCP PDU 3 and then determine the HFN mismatch. Since the PDCP PDU #3 may be also the corrupted packet, if the LHB and the last bit of the received HFN are different with respect to several PDCP PDUs in succession, the receiving device 120 may determine the HFN mismatch, rather than immediately determining the HFN mismatch through the single LHB check.

In the embodiment of FIG. 7, the PDCP PDU #2 is corrupted, but the mismatch of the HFN is recognized after the PDCP PDU #3 is received. This is because the LHB of the PDCP PDU #2 is decoded wrong. If the LHB is decoded correctly in the PDCP PDU #2, the receiving device 120 may receive the PDCP PDU #2 and then recognize error in the PDCP PDU #2. In this case, the receiving device 120 may prevent the HFN mismatch in advance by discarding the PDCP PDU #2.

As mentioned above, the mismatch of the ciphering parameter may be detected, by including the information (e.g., LHB) related to the ciphering parameter in the packet header. If detecting the mismatch of the ciphering parameter, the receiving device may perform a subsequent operation to synchronize the ciphering parameter. For example, the subsequent operation may include one of recovering the ciphering parameter or initialization of the ciphering parameter.

According to an embodiment, a layer for processing the packet of the receiving device which detects the mismatch of the ciphering parameter may report the mismatch of the ciphering parameter to a higher layer. Hence, to initialize the ciphering parameter, the receiving device may release a call, or trigger radio resource control (RRC) connection reestablish or intra-cell handover. Thus, a session is reset and information such as HFN and SN is initialized. This includes failure processing of an existing call, but may visualize the problem of the ciphering parameter mismatch which is not revealed to outside.

According to another embodiment, the receiving device which discovers the mismatch of the ciphering parameter may try to recover the corrupted ciphering parameter with more aggressive measures. By considering that the increment of the ciphering parameter is constant (e.g., the HFN increases by 1), the receiving device may try the recovery by decreasing the ciphering parameter value internally managed by the increment if detecting the ciphering parameter mismatch. For example, in the example of FIG. 7, the receiving device 120 receiving the PDCP PDU #3 and then detecting the HFN mismatch may recover the HFN to the 10 which is the synchronized value, by decreasing the current receive HNF by 1.

According to yet another embodiment, other ciphering parameter synchronization scheme may be performed. Further, two or more synchronization schemes may be applied in combination. An example of a procedure for the synchronization combining the above-stated recovery and initialization is now explained by referring to FIG. 8.

Figure 8:
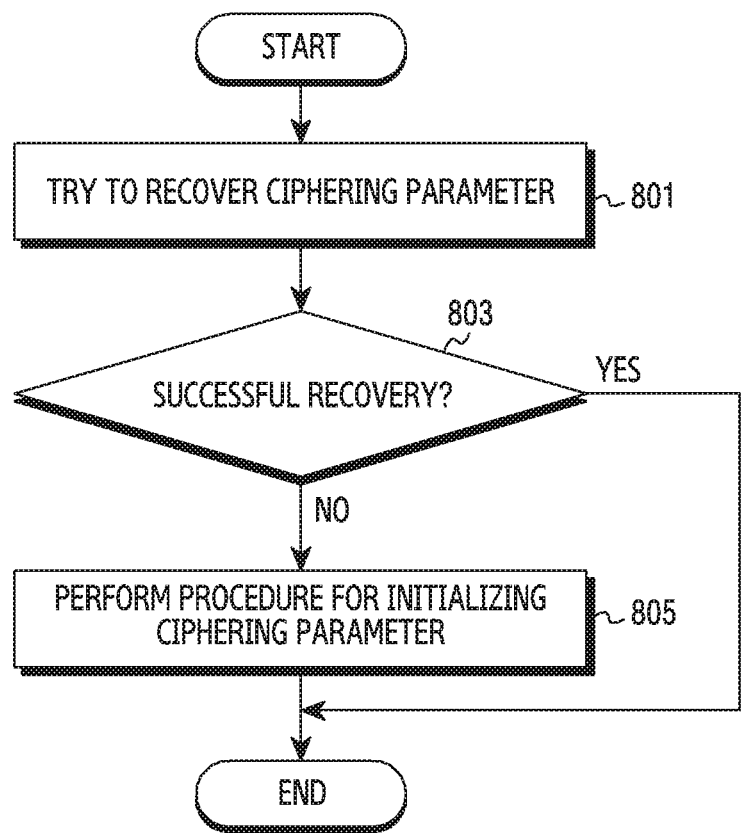
FIG. 8 illustrates a flowchart of a receiving device for resolving mismatch of a ciphering parameter in a wireless communication system according to various embodiments of the present disclosure.

FIG. 8 illustrates a flowchart of a receiving device for resolving mismatch of a ciphering parameter in a wireless communication system according to various embodiments of the present disclosure. FIG. 8 illustrates an operating method of the receiving device 120.

Referring to FIG. 8, in step 801, the receiving device tries to recover a ciphering parameter. The recovery is based on constant increment of the ciphering parameter. That is, the receiving device tries the recovery, by subtracting a current ciphering parameter value by the increment. According to another embodiment, even if the increment of the ciphering parameter is not constant, the receiving device may try the recovery, by subtracting an estimated value for a previous increment.

In step 803, the receiving device determines whether the recovery of the ciphering parameter is successful. The success of the recovery may be performed similarly to determining mismatch of the ciphering parameter. For example, the receiving device may determine whether the ciphering parameter matches using information relating to the ciphering parameter included in a packet received after the recovery attempt. If the ciphering parameter matches, the receiving device may determine the recovery success of the ciphering parameter. If the recovery of the ciphering parameter is successful, the receiving device finishes this procedure.

By contrast, if the recovery of the ciphering parameter fails, the receiving device performs a procedure for initializing the ciphering parameter, in step 805. For example, if the receiving device is a terminal, the receiving device may transmit a message requesting RRC reconnection establishment to the transmitting device which is a base station. For example, if the receiving device is a base station, the receiving device may trigger an inter-cell handover procedure for the transmitting device which is a terminal.

In the embodiment of FIG. 8, the receiving device initializes the ciphering parameter if the recovery of the ciphering parameter fails. At this time, even if the recovery fails, the receiving device may further try to recover the ciphering parameter a predefined number of times, and then initialize the ciphering parameter if the successive recoveries fail. Specifically, if determining the recovery failure in step 803, the receiving device may determine whether the recovery is tried for the predefined number of times, and if the recovery is not tried for the predefined number of times, return to step 801. In this case, a probability of the recovery success of the ciphering parameter may increase thanks to the repeated recovery attempts of the ciphering parameter.

As described above, since the transmitting device includes the SN of the packet and the ciphering parameter information derived from the SN in the header of the packet, the receiving device may detect the mismatch of the ciphering parameter and further synchronize the unmatched ciphering parameter. According to another embodiment, the receiving device may detect the mismatch of the ciphering parameter based on other information than the information contained in the header. For example, the layer where the ciphering is performed may use a packet SN of other layer to detect the mismatch of the ciphering parameter.

In general, since the PDCP SN and a radio link control (RLC) SN increase identically, a difference of the PDCP SN and the RLC SN may be maintained. Particularly, in a fixed wireless environment, since it is less likely to perform handover or RRC connection reestablishment, it is more likely that the difference of the PDCP SN and the RLC SN is maintained. Hence, the receiving device may monitor the difference of the PDCP SN and the RLC SN, determine corruption of the PDCP header if the difference value changes, and accordingly detect the mismatch of the ciphering parameter.

Yet, since a control packet such as a PDCP status report does not include the SN, the difference of the PDCP SN and the RLC SN may be changed by transmission of the control packet. This is due to a normal operation, rather than the packet corruption, which may require exceptional processing. For example, if the difference between the SN values increases or increases by two or more than before, the receiving device may predict the mismatch of the ciphering parameter and discard a corresponding packet.

The PDCP layer and the RLC layer are suggested as an example for ease of explanations. However, if there are two or more layers which increase with the packet SN of two different layers, the same manner may be applied. A procedure for predicting the mismatch of the ciphering parameter using the SN of other layer is now described by referring to FIG. 9.

Figure 9:
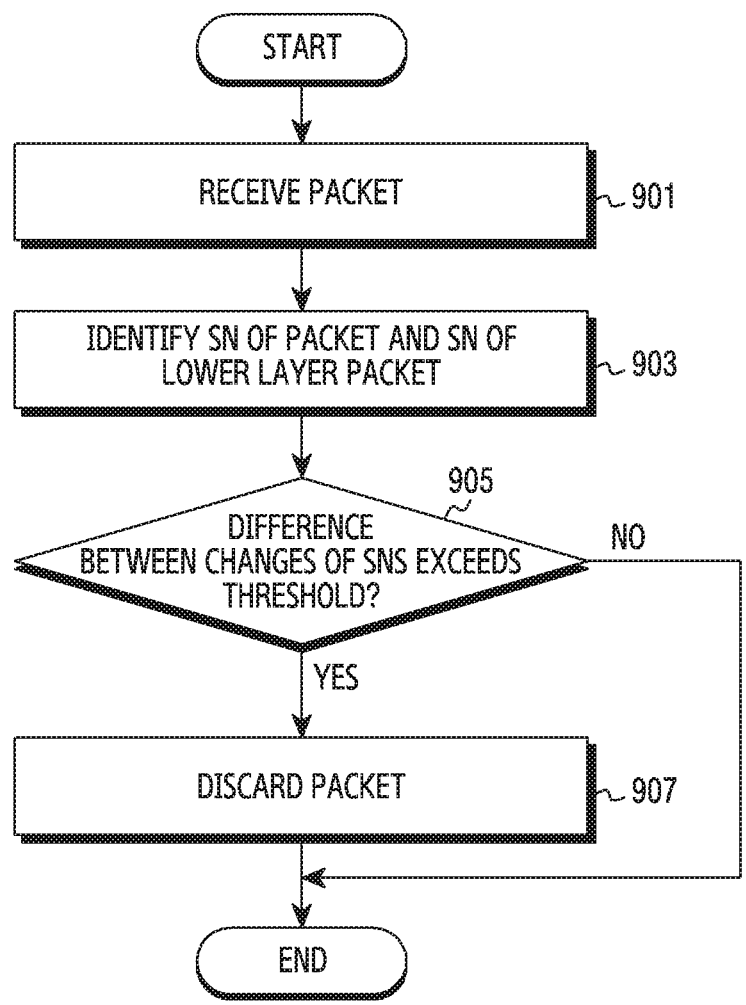
FIG. 9 illustrates a flowchart of a receiving device for detecting mismatch of a ciphering parameter in a wireless communication system according to various embodiments of the present disclosure.

FIG. 9 illustrates a flowchart of a receiving device for detecting mismatch of a ciphering parameter in a wireless communication system according to various embodiments of the present disclosure. FIG. 9 illustrates an operating method of the receiving device 120.

Referring to FIG. 9, in step 901, the receiving device receives a packet. The packet includes a header and a payload, and the header includes control information related to the packet. The header includes an SN of the packet, as the control information.

In step 903, the receiving device identifies the SN of the packet and an SN of a lower layer packet. Herein, the SN of the lower layer increases with an SN of a layer which performs the ciphering. Yet, if a control packet not including the SN is used, only the SN of the lower layer may increase. According to another embodiment, the layer lower may be replaced with a higher layer which has similar properties in relation to the SN increment.

In step 905, the receiving device determines whether a difference between changes of the SNs exceeds a threshold. That is, the receiving device determines whether a difference between the difference of the SN if a previous packet is received and the difference of the SNs identified in step 903 exceeds the threshold. For example, the threshold may be 2. If the difference between the changes of the SNs does not exceed the threshold, the receiving device finishes this procedure.

If the difference between the changes of the SNs exceeds the threshold, the receiving device discards a corresponding packet in step 907. As the packet is discarded, the ciphering parameter is not updated. That is, by discarding the packet, the receiving device may prevent mismatch of the ciphering parameter.

As stated above, by comparing the packet SNs of two or more layers, the receiving device may recognize corruption of the packet header of a target layer. The embodiment using the difference between the packet SNs may be conducted independently, or together with the embodiment using the ciphering parameter information (e.g., LHB) as aforementioned.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a receiving device in a wireless communication system, the method comprising:
updating a hyper frame number (HFN) of the receiving device based on information in a first packet data convergence protocol (PDCP) protocol data unit (PDU) which is received from a transmitting device, if a serial number of the first PDCP PDU is less than a serial number of a previous PDCP PDU which is previously received;
receiving, from the transmitting device, a second PDCP PDU; and
determining whether the HFN of the receiving device mismatches with a HFN of the transmitting device based on another information in the second PDCP PDU,
wherein the information in the first PDCP PDU includes the serial number of the first PDCP PDU and a last bit of the HFN of the first PDCP PDU for the transmitting device, and
wherein the another information in the second PDCP PDU includes a serial number of the second PDCP PDU and a last bit of the HFN of the second PDCP PDU for the transmitting device.

2. The method of claim 1, wherein the determining of whether the HFN of the receiving device with a HFN of the transmitting device mismatches comprises:
deriving the HFN of the transmitting device; and
checking validity of the HFN of the transmitting device using the another information in the second PDCP PDU.

3. The method of claim 1, further comprising:
if detecting the mismatch between the HFN of the receiving device and the HFN of the transmitting device, recovering the HFN of the receiving device by decreasing a value of the HFN of the receiving device by a predefined value.

4. The method of claim 1, further comprising:
if detecting the mismatch between the HFN of the receiving device and the HFN of the transmitting device, triggering a procedure for initializing the HFN of the receiving device.

5. A receiving device in a wireless communication system, the receiving device comprising:
at least one transceiver; and
at least one processor,
wherein the at least one processor is configured to:
update a hyper frame number (HFN) of the receiving device based on information in a first packet data convergence protocol (PDCP) protocol data unit (PDU) which is received from a transmitting device, if a serial number of the first PDCP PDU is less than a serial number of a previous PDCP PDU which is previously received,
receive, from the transmitting device, a second PDCP PDU via the at least one transceiver, and
determine whether the HFN of the receiving device mismatches with a HFN of the transmitting device based on another information in the second PDCP PDU,
wherein the information in the first PDCP PDU includes the serial number of the first PDCP PDU and a last bit of the HFN of the first PDCP PDU for the transmitting device, and
wherein the another information in the second PDCP PDU includes a serial number of the second PDCP PDU and a last bit of the HFN of the second PDCP PDU for the transmitting device.

6. The receiving device of claim 5, wherein the at least one processor is further configured to:
derive the HFN of the transmitting device, and
check validity of the HFN of the transmitting device using the another information in the second PDCP PDU.

7. The receiving device of claim 5, wherein, if detecting the mismatch between the HFN of the receiving device and the HFN of the transmitting device, the at least one processor is further configured to recover the HFN of the transmitting device by decreasing a value of the HFN of the receiving device by a predefined value.

8. The receiving device of claim 5, wherein, if detecting the mismatch between the HFN of the receiving device and the HFN of the transmitting device, the at least one processor is further configured to trigger a procedure for initializing the HFN of the receiving device.

9. The receiving device of claim 8, wherein the procedure for initializing the HFN of the receiving device comprises one of a radio resource control (RRC) connection reestablish procedure and an intra-cell handover.

10. The method of claim 4, wherein the procedure for initializing the HFN of the receiving device comprises one of a radio resource control (RRC) connection reestablish procedure or an intra-cell handover.

11. The method of claim 1, wherein the information in the second PDCP PDU is included in a last HFN bit (LHB) field of a PDCP header.

12. The receiving device of claim 5, wherein the information in the second PDCP PDU is included in a last HFN bit (LHB) field of a PDCP header.

* * * * *